Feb. 4, 1941.     G. C. SHERMAN     2,230,914
PRESSURE BOOSTER
Filed Aug. 15, 1938     2 Sheets-Sheet 2

Inventor
G. C. Sherman.
By Lacey & Lacey,
Attorneys

Patented Feb. 4, 1941

2,230,914

UNITED STATES PATENT OFFICE 2,230,914

PRESSURE BOOSTER

Gayle C. Sherman, Montgomery, Ala.

Application August 15, 1938, Serial No. 225,019

3 Claims. (Cl. 50—16)

This invention relates to an automatic pressure booster and it is one object of the invention to provide a device which may be installed in connection with practically any regulator of standard construction and serve to automatically boost or raise pressure at the gas regulator when necessary.

Another object of the invention is to provide a device of this character which is compact and of simplified construction and operates with very little friction, thus making it extremely sensitive when installed in place of a conventional dead weight regulator on a pilot controlled installation.

The invention is illustrated in the accompanying drawings, wherein

Figure 1:
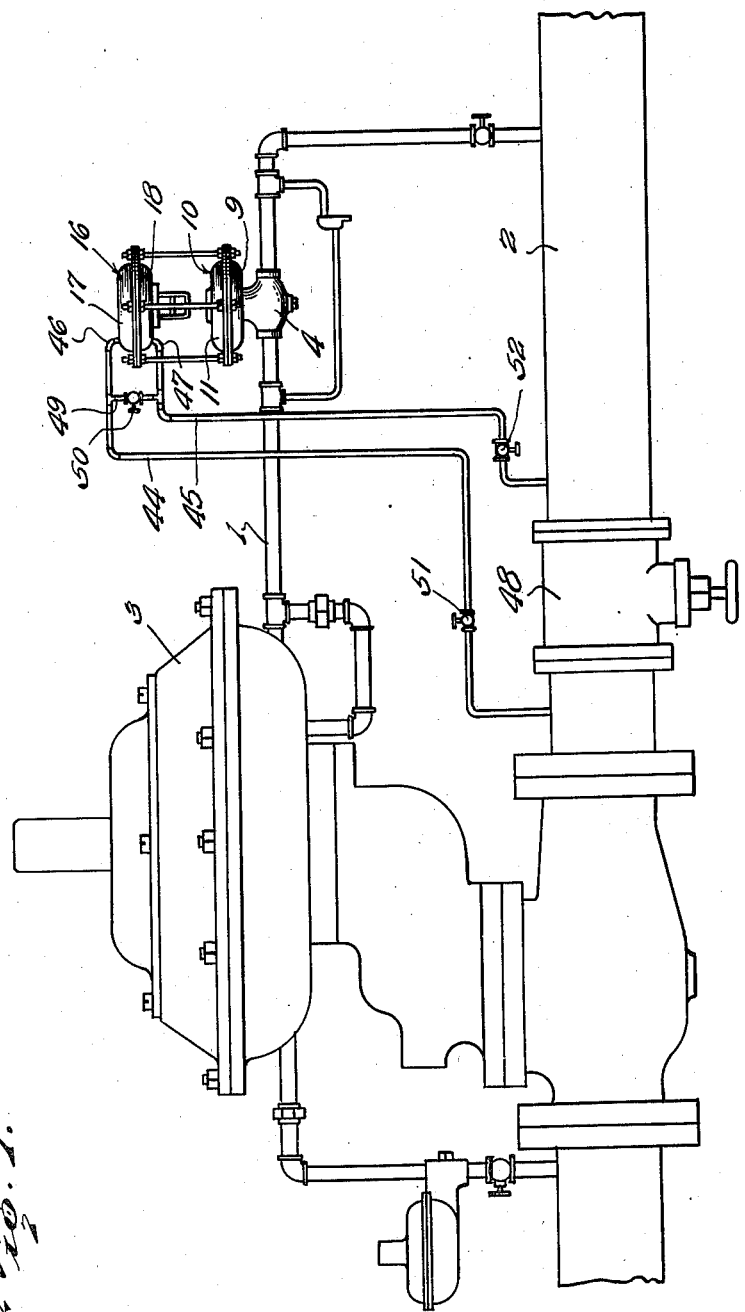
Figure 2:
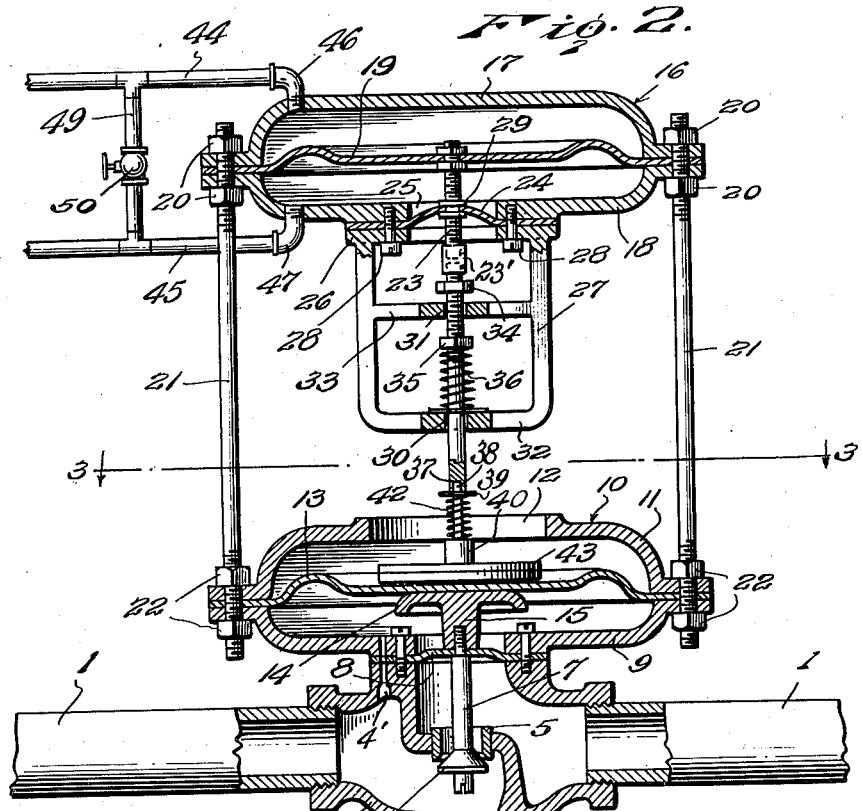
Figure 3:
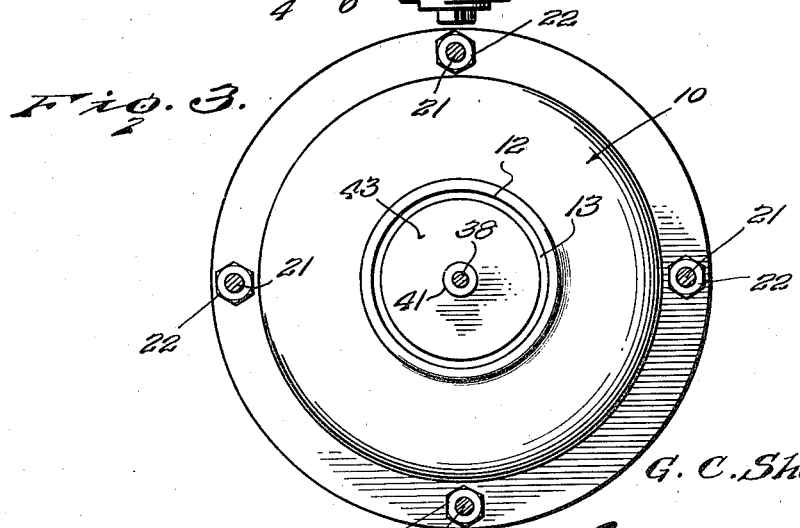

Figure 1 is a view in side elevation showing the improved automatic pressure booster installed in operative relation to a gas regulator in place of a dead weight regulator on a pilot controlled installation, Figure 2 is a sectional view taken vertically through the improved automatic pressure regulator, and Figure 3 is a sectional view taken horizontally along the line 3—3 of Figure 2.

This improved automatic pressure booster takes the place of a dead weight regulator customarily installed on a pilot controlled installation and is mounted in the pipe 1 leading from the gas main 2 to the main regulator 3 which is of a conventional construction and not illustrated in detail. A valve 4 is mounted in the pipe line 1, and upon referring to Figure 2, it will be seen that this valve is provided with the usual seat 5 against the lower end of which the valve head 6 engages when the valve is in a closed position. The stem 7 of the valve extends upwardly from the valve head and at its upper end passes through a diaphragm 8 which has its marginal portion secured between the top of the valve seat and the lower shell 9 of a diaphragm housing or casing 10. This diaphragm housing has its upper shell 11 open at its top, as shown at 12, and within the housing is mounted a diaphragm 13 bearing against the upper face of the disk 14 which carries a depending shank 15 in threaded engagement with the threaded upper end of the valve stem. In order to equalize pressure between the chamber under the diaphragm 13 and the upstream end of the valve 4, there has been provided a port 4' of small diameter which is formed through contacting portions of the valve casing and the lower shell 9 of the diaphragm housing. The structure so far described constitutes a low pressure service regulator which is to be loaded to act in response to a predetermined minimum pressure.

Above the low pressure service regulator is disposed a diaphragm housing or casing 16 having upper and lower sections or shells 17 and 18. A diaphragm 19 is disposed within the casing or housing 16 and has its marginal portion clamped between the outstanding flanges of the shells 17 and 18, the flanges of the shells being held in gripping engagement with the diaphragm by nuts 20 carried by the threaded upper end portions of a suitable number of rods 21. The rods extend vertically and have threaded lower end portions which pass through openings in the flanges of the two shells forming the diaphragm casing 16 and carry nuts 22 which, when tightened, cause marginal portions of the diaphragm 13 to be firmly gripped. A stem 23 which is threaded from its upper end for the major portion of its length extends downwardly from the center of the diaphragm 19 and passes through a leather diaphragm or disk 24 which constitutes a closure for an opening 25 formed centrally of the lower shell 18 of the diaphragm casing 16. The leather disk or diaphragm is of appreciably greater diameter than the opening 25 and is secured against the under face of the shell 18 by a ring 26 at the upper end of a frame 27, the ring being secured by a suitable number of screws 28 which pass through the ring and through the leather disk and are screwed into threaded sockets formed in the thickened central portion of the lower shell 18. The stem is anchored to the disk or diaphragm 24 by collars 29 thus providing an air and gas-tight closure for the opening 25 and eliminating use of a packing gland. Therefore, friction will be reduced to a minimum. The stem 23 extends through openings 30 and 31 formed in the lower bar 32 and the cross bar 33 of the frame 27 and above and below the cross bar carries nuts 34 and 35. The nut 34 constitutes an adjustable abutment to limit downward movement of the stem and the nut 35 constitutes an abutment for the upper end of a helical spring 36 disposed about the stem with its lower end bearing against the lower bar 32 of the open frame. Above the nut 34 the stem is severed, thus providing the stem with upper and lower sections which are connected by a sleeve or collar 23' fitting about adjoining ends of the two sections and secured thereto by set screws. The lower end portion of the stem is bored to form a socket 37 which slidably receives the upper end of a pin 38 and the lower end of the stem bears against a washer 39 which fits loosely about the pin. The lower end of the pin 38 fits into a socket 40 disposed centrally of the disk 14 and resting upon the diaphragm 13 over the disk 14. A helical spring 42 is disposed about the pin 38 with its upper end bearing against the washer 39 and its lower end resting upon the socket 40. It will thus be seen that a certain amount of independent movement will be permitted between the pin 38 and the stem 23 and the valve 6 permitted to have movement in an opening or closing direction in response to changes in pressure. Weights 43 are set in place about the socket 40 over the disk 14 to apply dead weight thereto. Pipes 44 and 45 lead from the pipe fittings or elbows 46 and 47 which are threaded through openings formed in the shells 17 and 18 of the diaphragm casing 16, and these pipes, which may be referred to as an "up-stream" pipe 44 and a "down-stream" pipe 45, have their other ends communicating with the gas main 2 at opposite sides of the valve 48 provided therein. A bridging pipe 49 extends between the pipes 44 and 45 adjacent the diaphragm housing 16, and in this bridging pipe is mounted a valve 50 to control flow of gas between the pipes 44 and 45.

When this pressure booster is in use, it is installed as shown in Figure 1. A tap is made in the high pressure side of the line leading to the main regulator setting. This tap leads to first control regulator which is a spring loaded regulator and is set so as to give a pressure somewhat higher than the final control pressure, and then through an adjustable needle valve to a connection in the main diaphragm chamber and on through the final control regulator to the outlet or low pressure side. In the operation of this system a small flow of gas is established through the needle valve and two regulators to the outlet side. The pressure under the diaphragm of the dead weight regulator is the same as the outlet pressure, as the pressure is transferred through the small openings 4' in the lower casting. If the outlet pressure tends to increase, the diaphragm of the regulator is raised which tends to hold back the pressure between the first and second regulators in such a way as to hold up the pressure under the main diaphragm, thus tending to close the valves. Conversely, if the pressure tends to decrease, the diaphragm in the second regulator is lowered which allows pressure between two regulators to decrease and also decreases pressure under the main diaphragm, which tends to open the main regulator valves and restore to outlet pressure required.

After the booster has been placed in the line or pipe 1, an opening is made in the line or pipe 2 on the up-stream side of the valve 48. A connection is made from this opening to the fitting 46 by means of the pipe 44 in which the valve 51 is placed. Another opening is made in the line 2 on the down-stream side of the valve 48 and is connected with the fitting 47 by the pipe 45 in which the valve 52 is placed. The valves 51 and 52 are of no use other than to cut off pressure if the booster is to be removed from the line and to set minimum pressure. Minimum pressure desired is obtained by placing weights on the diaphragm 13, the weights being shown at 43 on the drawing. While the regulator is operating at minimum pressure, the stem 23 should not touch the washer 39. To make this adjustment, it is necessary to cut the stem 23 at a point just above the nut 34 and connect the two sections of the stem with the link 23'. The purpose of the spring 36 and the nut 35 is to offset the weight of the diaphragm 19 and the parts attached to it. This should be adjusted so that with equal pressure on each side of the diaphragm 19 the stem 23 will not touch the washer 39.

The booster is now in place and operating at minimum pressure, there being no demand for higher pressure. To make the necessary adjustment so that the booster will operate as demand increases, it is necessary to close the valve 48 slowly until the pressure on the up-stream side of the valve increases, which pressure is transferred through the line 44 to the upper side of the diaphragm 19. This causes the stem 23 to move in a downward direction, or, in other words, close the valve 48 until a slight increase in the pressure in the line between the regulator 3 and the valve 48 is noted by connecting a U-gauge in this line or by other means. As the demand increases, the pressure in the line on the up-stream side of the valve 48 will increase due to the valve which acts as an orifice being partly closed. This increase in pressure causes the stem 23 to move downwardly, pressure being applied to the spring 42 and causing the valve 6 to open which will decrease pressure in the line 1 and under the diaphragm of the main regulator and allow the valves of the main regulator to open and increase pressure on the system to the desired point. Thus it will be seen that by means of the intermediate pressure acting on the diaphragm, and in turn to springs, pressure is being increased the same as if weights were added to the diaphragm 13. By using this means of boosting pressure, it is raised only when the demand justifies, while if other means were used, pressure may be increased when not needed. The bridging pipe 49 and the valve 50 are placed between the lines 44 and 45 so that, if the booster fails to decrease pressure because of the valve 48 being closed too much and causing intermediate pressure to be higher than it should be, the valve 50 may be opened slightly and by-pass the intermediate pressure in the line 44 to the line 45, thus decreasing the effective differential. This is especially useful where the valve may be in a pit or underground and the booster at another location.

Figure 1 shows the booster in the line near the main regulator. If the regulator should be located in a pit, the booster may be placed in the box above the ground by extending the lines 1, 44 and 45 to that location. Thus it will be seen that by using the valve 50, it will not be necessary to enter the pit or valve box to adjust the valve 48.

Having thus described the invention, what is claimed as new is:

1. In a structure of the character described, a valve casing, a valve member in the casing having an upwardly extending stem, a diaphragm housing, a diaphragm in said housing, a diaphragm secured between the valve casing and the diaphragm housing with the upper end of the stem extending through the diaphragm, a head carried by the protruding upper end portion of said stem and engaging the under face of the diaphragm in the diaphragm housing, a diaphragm housing supported above the first diaphragm housing and having a diaphragm therein, a stem carried by the diaphragm in the upper diaphragm housing and extending downwardly from the housing, a frame depending from the upper diaphragm housing and constituting a guide for said second-mentioned stem, a diaphragm secured about said second-mentioned stem and having marginal portions secured between the frame and the upper diaphragm housing and constituting a flexible closure for the lower portion of the upper diaphragm housing, an abutment adjustably mounted upon said second-mentioned stem for limiting downward movement of the second-mentioned stem by engagement with a portion of said frame, a support upon the diaphragm in the first diaphram housing, a pin extending upwardly from said support, a collar about said pin, a sleeve carried by said second-mentioned stem and slidably disposed about the pin and bearing against the collar, a spring between the collar and said support to yieldably resist upward movement of the pin and support relative to the sleeve, a second adjustable abutment upon said second-mentioned stem, and a spring about the second-mentioned stem between the second abutment and a portion of the frame and yieldably resisting downward movement of the stem.

2. In a device of the character described, a valve having a body and a closure member having a stem extending upwardly in the body, a diaphragm casing secured upon the valve body, a diaphragm in said casing, a head carried by the valve stem and bearing against the under face of the diaphragm, a support resting upon the diaphragm over the head, an upper diaphragm casing supported above the first diaphragm casing and having an opening in its bottom, a diaphragm in the second diaphragm casing, a stem carried by the diaphragm in the second diaphragm casing and extending downwardly through an opening in the lower portion thereof, a flexible closure for the opening in the second diaphragm casing secured about said second-mentioned stem, a guide for said second-mentioned stem extending downwardly from the second diaphragm casing, a pin extending upwardly from said support, a sleeve carried by said second-mentioned stem and slidably fiting about said pin, a spring about said pin having its lower end engaging the support and its upper end disposed under said sleeve whereby vertical movement of the sleeve with the second-mentioned stem adjust tension of the spring, an adjustment means carried by the second-mentioned stem, a spring between the adjustment means and said guide for yieldably resisting downward movement of the second-mentioned stem, and means for selectively admitting fluid under pressure into the second diaphragm casing above and below the diaphragm therein.

3. In a device of the character described, a valve having a housing and a closure member movable into and out of a closed position, and a regulator consisting of a lower diaphragm casing having a diaphragm therein operatively associated with the closure member, an upper diaphragm casing having a diaphragm therein and a stem extending downwardly from the second-mentioned diaphragm, means for yieldably resisting downward movement of said stem, a support upon the diaphragm in the lower diaphragm casing, an upstanding stem alined with said first-mentioned stem, a pin movably carried by said second-mentioned stem and operatively connecting said second-mentioned stem with the support, means for yieldably resisting movement of the pin and second-mentioned stem relative to each other in one direction, and means for admitting fluid under pressure into the upper diaphragm casing above and below the diaphragm therein.

GAYLE C. SHERMAN.